(12) United States Patent
Epstein et al.

(10) Patent No.: US 7,504,352 B2
(45) Date of Patent: Mar. 17, 2009

(54) CATALYST FOR PROPYLENE POLYMERIZATION

(75) Inventors: Ronald Alan Epstein, Upper Montclair, NJ (US); William Thomas Wallack, Stamford, CT (US)

(73) Assignee: Basell Polidefine Italia s.r.l., Milan (IT)

( * ) Notice: Subject to any disclaimer, the term of this patent is extended or adjusted under 35 U.S.C. 154(b) by 794 days.

(21) Appl. No.: 10/476,592

(22) PCT Filed: May 3, 2002

(86) PCT No.: PCT/US02/14044

§ 371 (c)(1), (2), (4) Date: Mar. 25, 2004

(87) PCT Pub. No.: WO02/090395

PCT Pub. Date: Nov. 14, 2002

(65) Prior Publication Data

US 2004/0152589 A1    Aug. 5, 2004

(51) Int. Cl.
C08F 4/642 (2006.01)
C08F 4/648 (2006.01)

(52) U.S. Cl. .................. 502/115; 502/127; 502/132; 502/134; 526/124.2; 526/124.9

(58) Field of Classification Search .................. 502/115, 502/127, 132, 134; 526/124.2, 124.9
See application file for complete search history.

(56) References Cited

U.S. PATENT DOCUMENTS

| | | | |
|---|---|---|---|
| 3,642,746 A | 2/1972 | Kashiwa et al. | 260/88.2 |
| 4,076,924 A | 2/1978 | Toyota et al. | 526/125 |
| 4,399,054 A | 8/1983 | Ferraris et al. | 252/429 B |
| 4,433,121 A | 2/1984 | Kabu et al. | 526/68 |
| 4,548,915 A * | 10/1985 | Goodall et al. | 502/104 |
| 4,668,753 A | 5/1987 | Kashiwa et al. | 526/348 |
| 4,710,482 A | 12/1987 | Job | 502/127 |
| 4,914,069 A | 4/1990 | Job et al. | 502/107 |
| 4,952,649 A | 8/1990 | Kioka et al. | 526/125 |
| 4,970,186 A | 11/1990 | Terano et al. | 502/125 |
| 5,034,484 A | 7/1991 | Demiddeleer et al. | 526/119 |
| 5,130,284 A | 7/1992 | Terano et al. | 502/125 |
| 5,221,651 A | 6/1993 | Sacchetti et al. | 502/126 |
| 5,270,276 A | 12/1993 | Job | 502/123 |
| 5,308,818 A | 5/1994 | Shamshoum et al. | 502/127 |
| 5,385,993 A | 1/1995 | Fujita | 526/119 |
| 5,414,063 A | 5/1995 | Seeger et al. | 526/88 |
| 5,521,263 A | 5/1996 | Seeger et al. | 526/68 |
| 5,571,877 A | 11/1996 | Mirra et al. | 526/64 |
| 5,578,541 A | 11/1996 | Sacchetti et al. | 502/126 |
| 5,621,046 A * | 4/1997 | Iwanami et al. | 525/240 |
| 5,710,229 A | 1/1998 | Garoff et al. | 526/348 |
| 5,767,215 A | 6/1998 | Garoff et al. | 526/348 |
| 5,932,510 A | 8/1999 | Hosaka et al. | 502/127 |
| 5,945,366 A | 8/1999 | Kataoka et al. | 502/127 |
| 5,962,361 A | 10/1999 | Zum Mallen | 502/107 |
| 6,090,903 A * | 7/2000 | Kataoka et al. | 526/351 |
| 6,201,079 B1 | 3/2001 | Streeky et al. | 526/124.8 |

FOREIGN PATENT DOCUMENTS

| | | |
|---|---|---|
| EP | 395083 A2 | 10/1990 |
| EP | 415704 A2 | 3/1991 |
| EP | 459009 A2 | 12/1991 |
| EP | 751160 A1 | 1/1997 |
| WO | 92/11296 | 7/1992 |

* cited by examiner

*Primary Examiner*—Caixia Lu
(74) *Attorney, Agent, or Firm*—William R. Reid

(57) ABSTRACT

A catalyst for use in the formation of polypropylene is disclosed that comprises a titanium compound having at least one titanium-halogen bond, supported on an activated, amorphous magnesium dihalide support that is essentially free of alkoxy functionality, with a titanium metal content of no more than about 2 wt %, based on the weight of the support, and an internal donor component. This catalyst is made by a: forming a combination of titanium tetrachloride, magnesium-containing compound that can be converted to magnesium dihalide and internal electron donor in an aromatic hydrocarbon solvent and bringing that combination to elevated temperature to form an intermediate product; washing the intermediate product with an aromatic hydrocarbon solvent at elevated temperature to produce a washed product and a supernatant followed by decantation of the supernatant therefrom; treating the washed product with titanium tetrachloride in an aromatic hydrocarbon solvent to form a treated product and a supernatant followed by heating of the treated product and supernatant, decantation of the supernatant therefrom, and washing of the treated product with an aromatic hydrocarbon solvent at elevated temperature; decantation of the supernatant therefrom, and washing of the treated product with an aromatic hydrocarbon solvent preferably at least one or two more times; and addition of an aliphatic hydrocarbon solvent to the treated product with decantation of the solvent therefrom to form a washed product which can be used as a propylene polymerization catalyst. If desired, after the formation of the washed product resulting from addition of the aliphatic hydrocarbon solvent, mineral oil can be added to the washed product to form a slurry containing the final catalyst.

10 Claims, No Drawings

CATALYST FOR PROPYLENE POLYMERIZATION

BACKGROUND OF THE INVENTION

This invention relates to the synthesis of a catalyst for the polymerization of propylene. This catalyst has high activity, and produces a polymer product having high stereospecificity and high bulk density. The catalyst's activity is long lived and it shows a good temperature response. All of these features are desirable for a commercial propylene polymerization catalyst.

SUMMARY OF THE INVENTION

The present invention relates to a process for forming a propylene polymerization catalyst. This process, in general terms, comprises: forming a combination of titanium tetrachloride, a soluble or insoluble magnesium-containing compound that can be converted to magnesium dihalide, such as a magnesium chloroalkoxide, and an internal electron donor, such as phthalate ester, in an aromatic hydrocarbon solvent and bringing that combination to elevated temperature to form an intermediate product which is separated by, for example decantation; washing the intermediate product with an aromatic hydrocarbon solvent at elevated temperature to produce a washed product and a supernatant followed by decantation of the supernatant therefrom; treating the washed product with titanium tetrachloride in an aromatic hydrocarbon solvent, preferably two or three more times, to form a treated product and a supernatant followed by heating of the treated product and supernatant, decantation of the supernatant therefrom, and washing of the treated product with an aromatic hydrocarbon solvent at elevated temperature, as previously described, with separation of the desired product (for example, also by decantation); and addition of an aliphatic hydrocarbon solvent to the treated product with decantation of the solvent therefrom to form a washed product which can be used as a propylene polymerization catalyst, optionally after the addition of mineral oil to the washed product to form a slurry containing the catalyst.

The soluble or insoluble magnesium-containing compound that can be converted to magnesium dihalide can be selected from one or more of the following types of compound: magnesium dialkoxides (e.g., magnesium diethoxide); chloromagnesium alkoxides (e.g., chloromagnesium ethoxide); magnesium dihalide electron donor adducts (e.g., $MgCl_2(EtOH)_x$ and $MgCl_2(THF)_x$, where THF is tetrahydrofuran and x in both cases is $\geqq 0.5$; alkylmagnesium halides ("Grignards", such as chlorobutylmagnesium; and dialkylmagnesium compounds, such as butylethylmagnesium. In all the foregoing classes of compound, the number of carbon atoms in the alkoxide/alkyl moiety or moieties, as appropriate, will range from one to about twelve, preferably four. Any of such precursors can be supported on an inert carrier, such as silica.

The internal electron donor can be selected from the known types of internal donor including the following classes: the phthalates and their derivatives; the benzoates and their derivatives; the silanes and siloxanes; and the polysilanes and polysiloxanes.

In accordance with the present invention, the selected magnesium dichloride source compound cannot be a magnesium dialkoxide when the selected internal donor is a halo phthaloyl derivative.

The process of this invention produces a polymerization catalyst that comprises a titanium compound having at least one titanium-halogen bond that is supported on an activated, amorphous magnesium dihalide support that is essentially free of alkoxy functionality, the titanium metal content in the catalyst preferably being no more than about 2 wt %, based on the weight of the support, and an internal donor, such as a phthalate ester donor.

DESCRIPTION OF THE PREFERRED EMBODIMENTS

While the following description focuses upon a certain preferred magnesium dihalide source material, namely, chloromagnesium ethoxide and internal donor (diisobutyl phthalate), it is to be understood that the broader possibilities for the selection of each, just described hereinabove, can be utilized in place of these two selections.

The catalyst of the present invention is made using a series of multiple treatment cycles, each of which involves the reaction of mixtures of titanium tetrachloride and an alkylbenzene solvent, such as toluene, with a support precursor followed by treatment of the solid with an aromatic hydrocarbon solvent, which is preferably an alkylbenzene solvent. Representative aromatic solvents that can be used in the process that is described herein include benzene, such haloaromatic solvents as the chlorobenzenes, and such alkylbenzene solvents as toluene and xylene. These reaction steps are carried out at elevated temperature. If a lower boiling solvent of this type, such as benzene, is used it may be necessary to use superatmospheric pressure to get to the desired temperature conditions. During the first titanium tetrachloride/aromatic solvent reaction step, an internal phthalate ester donor, such as the preferred di-isobutylphthalate, is added. If the ultimate polymer product that is to be produced is to have desirable particle size and morphology characteristics, an appropriate particle size and morphology-controlled support precursor needs to be used. The treatment cycles then need to be carried out in such a manner as to preserve these features in the final catalyst so that the polymer product replicates those features.

The initial step of the process of the present invention involves forming a combination of titanium tetrachloride, magnesium chloroalkoxide, for example, and phthalate ester in an aromatic solvent and bringing that combination to elevated temperature to form an intermediate product. The preferred magnesium chloroalkoxide will contain from one to about twelve carbon atoms in the alkyl moiety therein. The most preferred magnesium chloroalkoxide is magnesium chloroethoxide. Toluene has been found to be a preferred alkylbenzene solvent for use, with xylene, ethylbenzene, propylbenzene, isopropylbenzene, and trimethylbenzene also being useful. The preferred phthalate ester may contain from one to about twelve carbon atoms in the alkyl groups therein, with representative compounds including dimethyl phthalate, diethyl phthalate, di-n-propyl phthalate, di-isopropyl phthalate, di-n-butyl phthalate, di-butyl phthalate, di-tert-butyl phthalate, diisoamyl phthalate, di-tert-amyl phthalate, di-neopentyl phthalate, di-2-ethylhexyl phthalate, and di-2-ethyldecyl phthalate. The donor can be added at room temperature to the other components and the mixture can then be brought to elevated temperature (for example, at about 100° C. to about 140° C., preferably from about 110° C. to about 120° C.) or it can be added to the other two components either at room temperature and heated up to about 100° C. or can be added to those components after they have been heated to a desired temperature. The amount of titanium tetrachloride to aromatic solvent will generally range from about 40% to 80% on a volume basis and, generally, from about three to about four treatment steps have been found to be adequate. The volume of titanium tetrachloride and solvent to grams of support precursor that is employed will generally be from about 5 to about 10 milliliters of titanium tetrachloride and solvent per gram of support precursor. The combination of components is preferably held together for up to about ten hours, preferably from about one to about two hours and is agitated. The intermediate solid product from this initial reaction step is then recovered after the supernatant is decanted.

The intermediate product from the initial step is then washed with an aromatic hydrocarbon solvent, such as an alkylbenzene solvent (for example, toluene), at elevated temperature (e.g., from about 100° C. up to the boiling point of the solvent) to produce a washed product and a supernatant phase. The washing can be practiced in up to about three separate washing steps. The supernatant in each washing step is decanted from the washed product. This washing serves to remove undesirable by-products that contain titanium. The volume of aromatic solvent that is used per gram of support precursor in this step will generally range from about 5 to about 25 milliliters per gram.

The washed product from the preceding step is then treated with titanium tetrachloride in an aromatic solvent of the type previously described under the previously described conditions to form a treated product and a supernatant. This step converts unreacted alkoxide moieties of the starting magnesium chloroalkoxide reagent and extracts undesired titanium-containing by-products. This combination is then heated (e.g., at from about 100° C. to about 140° C.) followed by decantation of the supernatant phase that exist and washing of the treated product with an aromatic hydrocarbon solvent, preferably in a washing cycle of from one to two step(s) each.

After the desired number of treatment/wash cycles, the product from the preceding step then has an aliphatic hydrocarbon solvent, such as hexane, added to it with decantation of the resulting supernatant phase therefrom. Washing of the catalyst with aliphatic solvent (e.g., up to about 3-8 separate washing steps) serves to remove free titanium tetrachloride and residual aromatic solvent. This forms a washed product that can be used as the catalyst.

An optional final step is the addition of mineral oil to the washed product from the preceding step to form a mineral oil/catalyst slurry that can be employed as the propylene polymerization catalyst. Drying of this slurry is usually avoided since it can result in a substantial decrease in catalyst activity (e.g., up to as much as 50%).

The catalyst composition that can be formed from the previously described process appears to be a novel composition of matter in certain embodiments. It comprises a titanium compound having at least one titanium-halogen bond that is supported on an activated, amorphous magnesium dihalide support that is essentially free of alkoxy functionality. In its broadest embodiment, the catalyst composition has the following physical parameters: weight percent titanium—from about 1% to about 4%; weight percent phthalate ester—from about 10% to about 25%; phthalate ester to titanium molar ratio—from about 0.9 to about 2; weight percent magnesium—from about 14% to about 23%; magnesium to titanium molar ratio—from about 7 to about 30; surface area—from about 250 m$^2$/gm to about 500 m$^2$/gm; pore volume—from about 0.2 cc/gm to about 0.5 cc/gm; and average pore diameter—no more than about 50 Angstroms.

More preferred embodiments of the catalyst composition have the following physical parameters: weight percent titanium—less than about 2.0%, most preferably from about 1% to about 2.5%; weight percent phthalate ester—from about 10% to about 20%; phthalate ester to titanium molar ratio—from about 1 to about 1.9; weight percent magnesium—from about 18% to about 21%; magnesium to titanium molar ratio—from about 14 to about 29; surface area—from about 300 m$^2$/gm to about 500 m$^2$/gm; pore volume—from about 0.2 cc/gm to about 0.4 cc/gm; and average pore diameter—no more than about 35 Angstroms.

Based on the very high productivity and low titanium (Ti) content of the catalyst of this invention, the polypropylene product that is formed from using that catalyst composition is deemed to be a novel composition having a very low residual Ti concentration. Depending upon the polymerization time and temperature, polymer with less than about 0.20 ppm Ti, preferably less than 0.15 ppm Ti, most preferably less than 0.10 ppm Ti can be produced.

The Examples that follow are provided to illustrate certain preferred embodiments of the invention.

EXAMPLE 1

Catalyst Preparation

In a nitrogen filled dry box, 10.0 g of a mixed phase ClMg (OEt) was charged into a 500 ml 4-neck round bottom flask. The flask was fitted with a mechanical stirrer, nitrogen inlet adapter, condenser with nitrogen outlet adapter, and septum, and removed from the dry box to a Schlenk line. Then, 30 ml of dry toluene was added, the mixture was stirred to suspend the solid, and 20 ml of TiCl$_4$ was added to the stirred slurry at a rate that maintained the temperature $\leq$25° C. The slurry was heated to 70° C. and 3.78 g of diisobutylphthalate was added. The mixture was heated to 115° C. and was held at this temperature for two hours.

At the end of the reaction, the agitation was stopped and the solids were allowed to settle. The supernatant was decanted, 200 ml of toluene was added, the reaction media was heated to just below reflux, and was held for fifteen minutes at this temperature. The solids were then allowed to settle and the supernatant was decanted. The toluene treatment was then repeated.

Then, 30 ml of toluene and 20 ml of TiCl$_4$ were added, the media was heated to 115° C., and was held for one hour. After allowing the solids to settle, the liquid was decanted, and the solids were treated twice with 200 ml of toluene as described above. After these treatments, the sequence of the TiCl$_4$-toluene reaction and two toluene treatments was repeated twice. After the last toluene decant, the solids were washed five times with 100 ml each of hexane. The catalyst was then isolated as a slurry.

Analysis of the solid catalyst component showed it to contain 21 wt % Mg and 1.5 wt % Ti.

Catalyst Testing

A 4 liter autoclave equipped with an agitator was purged with nitrogen until oxygen and water have been reduced to acceptable levels. Then, under a N$_2$ purge, 50 ml of purified hexane was added to the reactor, followed by 7.0 mmole of TEAL and 0.48 mmole of dicyclopentyldimethoxy-silane. The catalyst slurry prepared above, containing 4 to 6 mg of the solid catalyst, was added to 45 ml of purified hexane and then was added to the reactor. The reactor was closed and 2.5 l of purified propylene was added, followed by 3.6 l (STP) of H$_2$. The contents of the reactor were stirred and were heated to 70° C. The reaction mixture was maintained at 70° C. for one or two hours. The reactor was then vented and cooled.

The resulting polymer was collected and dried. The polymer was weighed and an activity, defined as kg polymer/g catalyst charged was calculated. The polymer poured bulk density (PBD) and total xylene insolubles (TXI) were measured. The controlled particle size distribution and morphology of the starting support precursor was maintained in the polymer particles. The results of these tests were shown in Table 1. In many cases, 2-3 tests were run on each catalyst and the average results of these tests were reported.

EXAMPLE 2

A catalyst preparation was carried out using the procedure described in Example 1, except that 25 ml of toluene and 25 ml of $TiCl_4$ were used in the reaction steps. Analysis of the solid catalyst component showed it to contain 21 wt % Mg and 1.5 wt % Ti. Testing was carried out as described in Example 1, and the results are shown in Table 1, below.

EXAMPLE 3

A catalyst preparation was carried out using the procedure described in Example 1, except that 20 ml of toluene and 30 ml of $TiCl_4$ were used in the reaction steps, and only 1×200 ml toluene treatment was used after each $TiCl_4$/toluene reaction. Analysis of the solid catalyst component showed it to contain 19 wt % Mg and 1.8 wt % Ti. Testing was carried out as described in Example 1, and the results are shown in Table 1, below.

EXAMPLE 4

A catalyst preparation was carried out using the procedure described in Example 1, except that the reactor was a 250 ml round bottom flask, 10 ml of toluene and 40 ml of $TiCl_4$ were used in the reaction steps, and 2×100 ml toluene treatments were used after each $TiCl_4$/toluene reaction. Analysis of the solid catalyst component showed it to contain 19 wt % Mg and 1.6 wt % Ti. Testing was carried out as described in Example 1, and the results are shown in Table 1, below.

EXAMPLE 5

A solid catalyst component was synthesized following the procedure described in Example 1, except that the reactor was a 250 ml round bottom flask and 2×100 ml toluene treatments were used after each $TiCl_4$/toluene reaction step. Analysis of the solid catalyst component showed it to contain 19 wt % Mg and 1.5 wt % Ti. Testing was carried out as described in Example 1, and the results are shown in Table 1, below.

EXAMPLE 6

The procedure described in Example 1 was used to prepare a catalyst, except that the reactor was a 250 ml round bottom flask and one 100 ml toluene treatment was used after each $TiCl_4$/toluene reaction step. Analysis of the solid catalyst component showed it to contain 17 wt % Mg and 3.0 wt % Ti. Testing was carried out as described in Example 1, and the results are shown in Table 1, below.

EXAMPLE 7

A catalyst preparation was carried out using the procedure described in Example 3, except that the reactor was a 250 ml round bottom flask and 2×100 ml toluene treatments were used after each $TiCl_4$/toluene reaction step. Analysis of the solid catalyst component showed it to contain 20 wt % Mg and 1.7 wt % Ti. Testing was carried out as described in Example 1, and the results are shown in Table 1, below.

EXAMPLE 8

A solid catalyst component was synthesized following the procedure described in Example 3, except that the reactor was a 250 ml round bottom flask and 1×100 ml toluene treatment was used after each $TiCl_4$/toluene reaction step. Analysis of the solid catalyst component showed it to contain 17 wt % Mg and 2.9 wt % Ti. Testing was carried out as described in Example 1, and the results are shown in Table 1, below.

EXAMPLE 9

A catalyst preparation was carried out using the procedure described in Example 1, except that 40 ml of toluene and 60 ml of $TiCl_4$ were used in each reaction step. Analysis of the solid catalyst component showed it to contain 20 wt % Mg and 1.2 wt % Ti. Testing was carried out as described in Example 1, and the results are shown in Table 1, below.

EXAMPLE 10

A catalyst preparation was carried out using the procedure described in Example 1, except that 60 ml of toluene and 40 ml of $TiCl_4$ were used in each reaction step. Analysis of the solid catalyst component showed it to contain 20 wt % Mg and 1.5 wt % Ti. Testing was carried out as described in Example 1, and the results are shown in Table 1, below.

EXAMPLE 11

An aliquot of the catalyst slurry prepared in Example 9 was dried under vacuum. The test procedure described in Example 1 was followed except that the dry catalyst is added to the 45 ml of hexane instead of a slurry. The results are found in Table 1, below.

EXAMPLE 12

A catalyst preparation was carried out using the procedure described in Example 3, except that the reactor was a 250 ml round bottom flask, and three series of $TiCl_4$-toluene reactions and 1×100 toluene treatments are used. Analysis of the solid catalyst component showed it to contain 15 wt % Mg and 3.8 wt % Ti. Testing was carried out as described in Example 1, and the results are shown in Table 1, below.

EXAMPLE 13

A catalyst preparation was carried out using the procedure described in Example 1, except that the reactor was a 250 ml round bottom flask, and three series of $TiCl_4$-toluene reactions and 1×100 toluene treatments were used.

Analysis of the solid catalyst component showed it to contain 15 wt % Mg and 3.8 wt % Ti. Testing was carried out as described in Example 1, and the results are shown in Table 1, below.

EXAMPLE 14

In this Example, 5.0 g of a mixed phase ClMg(OEt) was charged into a 250 ml 4-neck round bottom flask as described in Example 1. Then, 30 ml of toluene was added, the mixture was stirred to suspend the solid, 20 ml of $TiCl_4$ was added to the stirred slurry, the slurry was heated to 90° C., and 1.95 g of di-isobutylphthalate was added. The mixture was heated to 115° C. and was held at this temperature for two hours.

Following the procedure in Example 1, the supernatant was decanted, and two treatments with 100 ml of toluene each were carried out. The $TiCl_4$+toluene reaction/toluene treatment step were repeated three additional times. The solids were then washed four times with 100 ml heptane each time.

An additional 100 ml of heptane was added to the flask, the slurry was transferred to a vacuum filter apparatus, filtered and dried.

Analysis of the solid catalyst component showed it to contain 21 wt % Mg and 1.3 wt % Ti. Testing was carried out as described in Example 1, except that the dry catalyst was added to the 45 ml of hexane instead of a slurry. The results are shown in Table 1, below.

EXAMPLE 15

A slurry of a solid catalyst component was prepared in then same manner as Example 14 with the exception that the di-isobutylphthalate was added at room temperature after the addition of the initial $TiCl_4$ charge. Analysis of the solid catalyst component showed it to contain 20 wt % Mg and 1.4 wt % Ti. Polymerization testing results, obtained under the same conditions as shown in Example 1, are found in Table 1, below.

EXAMPLE 16

A portion of the catalyst slurry obtained in Example 15 was filtered and vacuum dried. Table 1 contains the polymerization test results for this catalyst, carried out under the conditions of Example 1, modified for the use of dry catalyst as in Example 11. The results of this Example are not illustrated in Table 1.

EXAMPLE 17

The catalyst prepared in Example 1 was tested for polymerization performance as in Example 1, except that the test is run at 80° C. for one hour. The averaged results of two tests were as follows: activity, 132.6 kg/g catalyst; poured bulk density, 0.474 g/ml; total xylene insolubles, 99.37 wt %.

COMPARATIVE EXAMPLE 1

The procedure described in Example 12 was followed to produce a solid catalyst component except that 1.43 g of phthaloyl dichloride was substituted for diisobutylphthalate. The results of polymerization testing using the procedure in Example 1, modified for the use of dry catalyst as in Example 11, are presented in Table 1, below.

COMPARATIVE EXAMPLE 2

A catalyst preparation was carried out using the procedure described in Example 1, except that 40 ml of toluene and 10 ml of $TiCl_4$ were used in the reaction steps. Analysis of the solid catalyst component showed it to contain 22 wt % Mg and 0.69 wt % Ti. Testing was carried out as described in Example 1, and the results are shown in Table 1, below.

TABLE 1

Catalyst Performance Results

| Example # | # Tests averaged | time of run, hr | yield kg/g cat | PBD g/ml | TXI wt % |
|---|---|---|---|---|---|
| 1 | 3 | 1 | 85.5 | 0.468 | 98.82 |
| 1 | 1 | 2 | 120.6 | 0.473 | 98.93 |
| 2 | 2 | 1 | 74.3 | 0.458 | 98.96 |
| 3 | 2 | 1 | 76.4 | 0.479 | 98.86 |
| 4 | 2 | 1 | 66.9 | 0.487 | 98.95 |
| 5 | 2 | 1 | 80.9 | 0.472 | 98.96 |
| 6 | 2 | 1 | 77.5 | 0.467 | 98.99 |
| 7 | 3 | 1 | 69.1 | 0.483 | 98.96 |
| 8 | 3 | 1 | 69.5 | 0.470 | 98.88 |
| 9 | 3 | 1 | 69.1 | 0.470 | 99.03 |
| 9 | 1 | 2 | 100.2 | 0.478 | 98.95 |
| 10 | 2 | 1 | 60.7 | 0.453 | 98.78 |
| 11 | 2 | 1 | 46.3 | 0.410 | 98.88 |
| 12 | 2 | 1 | 53.5 | 0.472 | 98.49 |
| 13 | 2 | 1 | 65.0 | 0.457 | 99.00 |
| 14 | 3 | 1 | 48.6 | 0.428 | 99.04 |
| 15 | 1 | 1 | 87.9 | 0.424 | 98.80 |
| 16 | 2 | 1 | 66.0 | 0.359 | 98.67 |
| Comp. 1 | 1 | 1 | 20.7 | 0.460 | 99.33 |
| Comp. 2 | 2 | 1 | 35.9 | 0.407 | 99.37 |

EXAMPLE 18

In this Example, 5.0 g of a pure phase ClMg(OEt), as described in U.S. Pat. No. 5,262,573, was slurried with 30 ml of toluene and 20 ml of $TiCl_4$. The slurry was heated to 90° C. and 1.94 g of diisobutylphthalate was added. The remainder of the process was then carried out as described in Example 1, using 100 ml of toluene for the treatment steps and 30 ml of toluene and 20 ml of $TiCl_4$ for the reaction steps. The product was washed with heptane and isolated by vacuum drying.

Testing was carried out as described in Example 1, and the results are shown in the following Table:

| # Tests averaged | time of run, hr | yield kg/g cat | PBD g/ml | TXI wt % |
|---|---|---|---|---|
| 3 | 1 | 68.5 | 0.386 | 98.62 |

The foregoing Examples illustrate the following features and performance characteristics of the catalyst. Examples 1-8 describe modes for preparing the catalyst along with the effects of varying the $TiCl_4$/toluene ratio and number and volume of toluene treatments. Example 1 versus Example 9, and Example 3 and 7 versus Example 10 show the benefit of reducing the volume of the $TiCl_4$/toluene reaction mixture from 10 ml/g support precursor (Examples 9 and 10) to 5 ml/g support precursor (Examples 1, 3, and 7).

Example 9 versus Example 11 illustrates the improvement in catalyst performance when the catalyst is not dried and is isolated as a slurry versus isolation as a dry powder. Example 3 versus 12 and Example 6 versus 13 exhibit the difference found for carrying out four versus three treatment cycles. Example 9 versus Example 15 compares the effects of the temperature of addition of the diisobutylphthalate (DIBP) internal donor, 70° C. versus room temperature, for catalysts isolated as slurries (room temperature, higher activity).

Examples 14, 11, and 16 show the effect of the temperature of addition of the DIBP internal donor, 90° C. versus 70° C. versus room temperature, for catalysts isolated as dry powders (room temperature, higher activity).

Example 17 shows the increase in activity achieved when the polymerization test is run at 80° C. instead of 70° C.

Example 18, which is best compared to Example 11 that used a mixed phase ClMg(OEt) support precursor, shows the present invention using, as a starting reagent, a pure phase ClMg(OEt) material. The activity of the catalyst was almost 50% greater than that for the mixed phase support material.

Example 14 versus Comparative Example 1 shows the use of a phthalate ester, DIBP in this case, gives a superior catalyst to the use of the corresponding acid chloride, phthaloyl dichloride, when ClMg(OEt) is the support precursor (dry catalyst).

Comparative Example 2 versus Examples 1-4, shows that reducing the volume % of $TiCl_4$ in the $TiCl_4$/toluene reaction mixture from 40% to 20% causes a large loss in activity, not evident from the trend found in the 80%-40% range.

The foregoing Examples, since they are being provided to merely illustrate certain embodiments of the present invention, should not be construed in a limiting fashion. The scope of protection sought is set forth in the claims that follow.

We claim:

1. A process for forming a propylene polymerization catalyst which comprises: forming a combination of titanium tetrachloride, a magnesium-containing compound that can be converted to magnesium dihalide and an internal electron donor in an aromatic hydrocarbon solvent, with the proviso that, the magnesium-containing compound cannot be a magnesium dialkoxide when the internal donor is a halo phthaloyl derivative, and bringing that combination, as modified by the proviso clause, to elevated temperature to form an intermediate product; washing the intermediate product with an aromatic hydrocarbon solvent at elevated temperature to produce a washed product and a supernatant followed by decantation of the supernatant therefrom; treating the washed product with titanium tetrachloride in an aromatic hydrocarbon solvent to form a treated product and a supernatant followed by heating of the treated product and supernatant, decantation of the supernatant therefrom, and washing of the treated product with an aromatic hydrocarbon solvent at elevated temperature to produce a washed product and a supernatant followed by decantation of the supernatant therefrom; treating the washed product with titanium tetrachloride in an aromatic hydrocarbon solvent at least one more time, to form a treated product and a supernatant followed by heating of the treated product and supernatant, decantation of the supernatant therefrom, and washing of the treated product with an aromatic hydrocarbon solvent at elevated temperature to produce a washed product and a supernatant followed by decantation of the supernatant therefrom; and addition of an aliphatic hydrocarbon solvent to the washed treated product with decantation of the solvent therefrom to form a doubly washed product which can be used as a propylene polymerization catalyst.

2. A process as claimed in claim 1, further comprising: after the formation of the doubly washed product resulting from addition of the aliphatic hydrocarbon solvent, and adding mineral oil to the doubly washed product to form a slurry containing the propylene polymerization catalyst.

3. A process as claimed in claim 1 wherein the aromatic hydrocarbon solvent employed in the several washings is an alkylbenzene solvent.

4. A process as claimed in claim 1 wherein the magnesium-containing compound that can be converted to magnesium dihalide is a magnesium chloroalkoxide that contains up to about twelve carbon atoms in its alkyl moiety.

5. A process as claimed in claim 1 wherein the internal electron donor is a phthalate ester that contains up to about twelve carbon atoms in its alkyl groups.

6. A process as claimed in claim 4 wherein the aromatic hydrocarbon solvent is toluene and the magnesium chloroalkoxide is magnesium chloroethoxide.

7. A process as claimed in claim 2 wherein the aliphatic solvent is hexane.

8. A process as claimed in claim 4 wherein the magnesium chloroalkoxide contains four carbon atoms in its alkyl moiety.

9. A process as claimed in claim 5 wherein the phthalate ester is diisobutylphthalate.

10. A process as claimed in claim 1 wherein the aromatic hydrocarbon solvent is toluene, the magnesium-containing compound that can be converted to magnesium dihalide is a magnesium chloroalkoxide, and the internal electron donor is a phthalate ester that contains up to about twelve carbon atoms in its alkyl groups.

* * * * *